Figure 1:
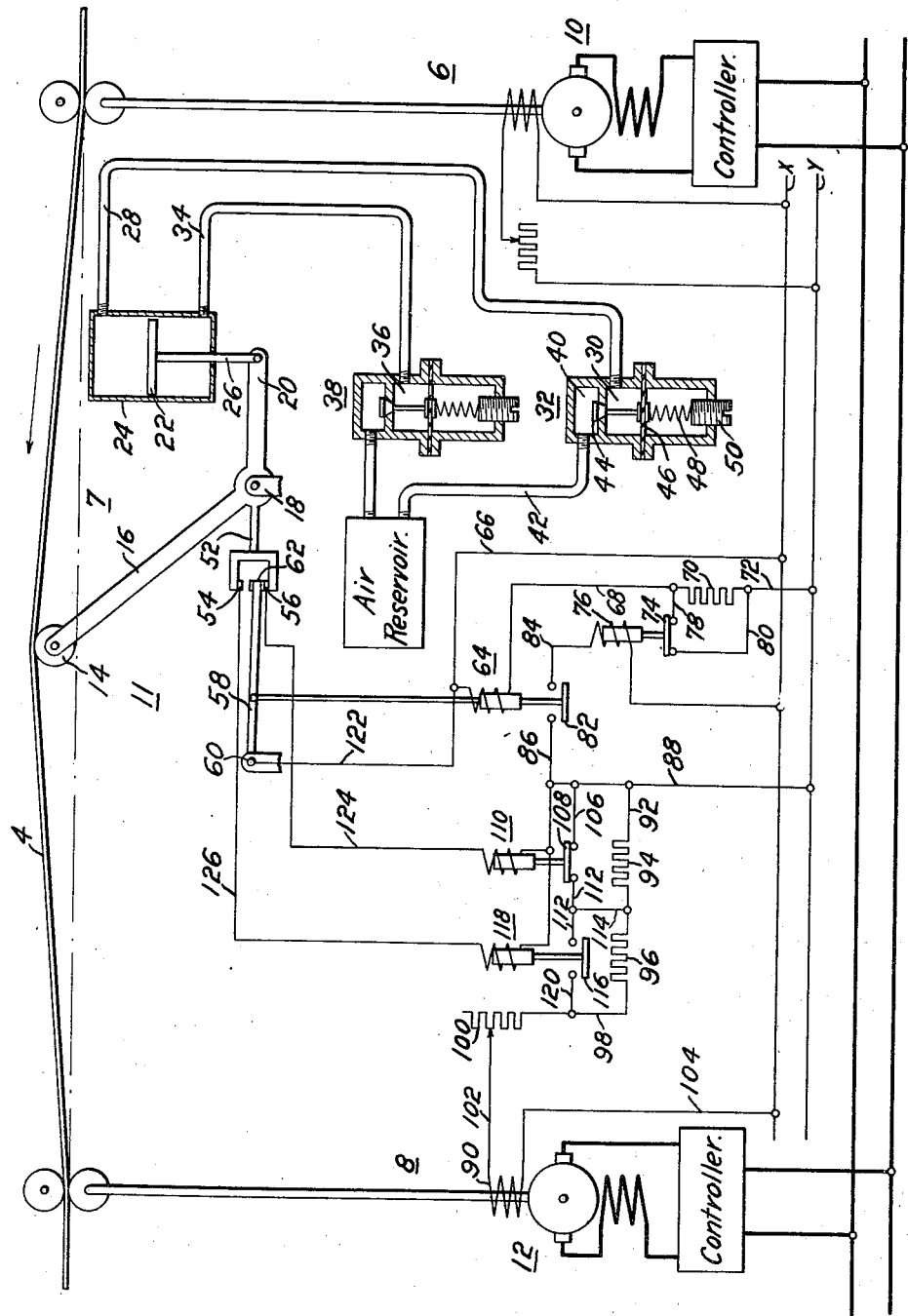

Dec. 5, 1939.   W. G. COOK   2,182,659
FORCE REGULATING SYSTEM
Filed May 25, 1938   2 Sheets-Sheet 1

WITNESSES:
Wm. B. Sellers
Joe Weber

INVENTOR
Willard G. Cook.
BY G. M. Crawford
ATTORNEY

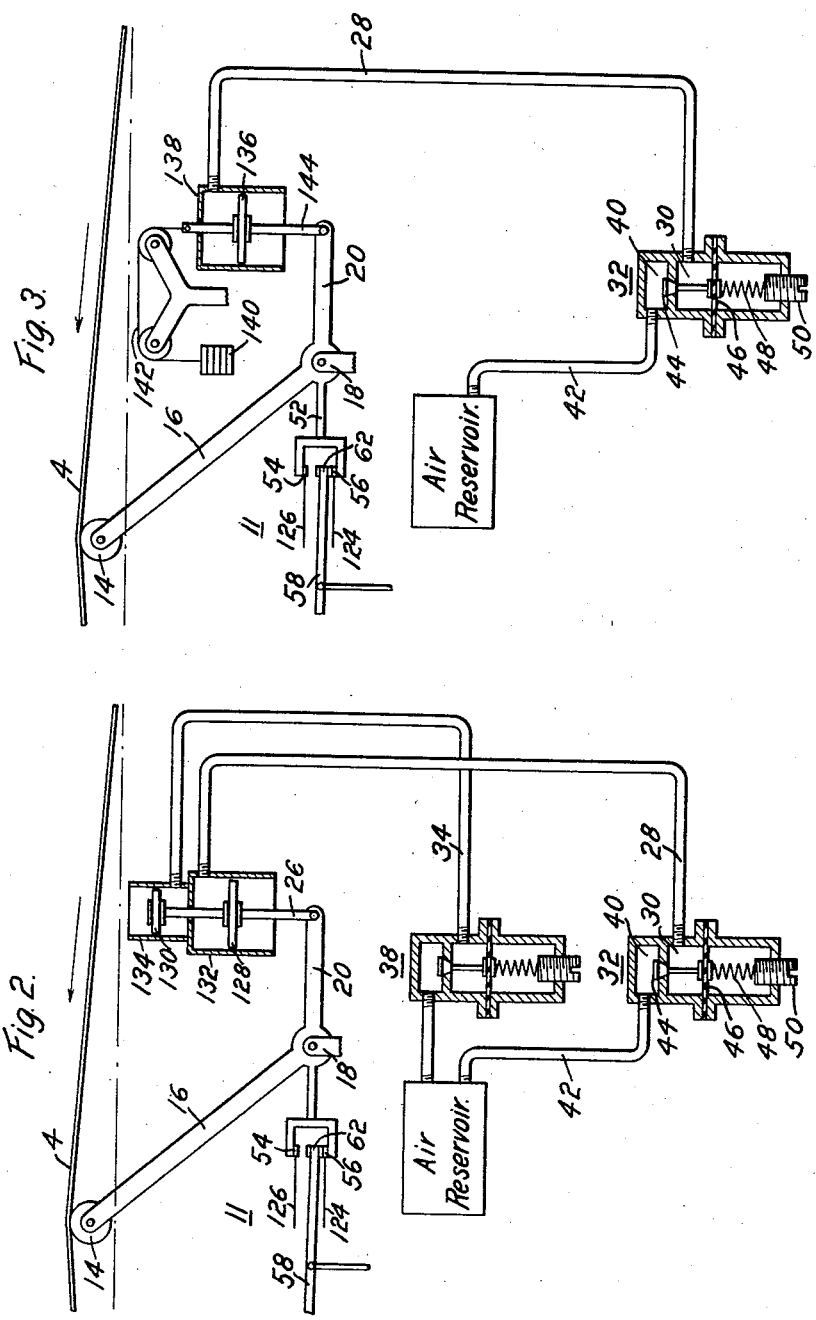

Patented Dec. 5, 1939

2,182,659

UNITED STATES PATENT OFFICE 2,182,659

FORCE REGULATING SYSTEM

Willard G. Cook, Wilkinsburg, Pa., assignor to Westinghouse Electric & Manufacturing Company, East Pittsburgh, Pa., a corporation of Pennsylvania Application May 25, 1938, Serial No. 209,974

11 Claims. (Cl. 80—35)

My invention relates, generally, to force regulators and operating systems therefor, and, more particularly to means for extending the range of forces that may be provided by any fluid pressure operated force producing device, such, for instance, as fluid pressure operated strip tensioning devices and the like.

It is common practice to provide predetermined adjustable forces for operating various mechanisms by actuating a piston by means of a fluid, such, for example, as air under pressure and regulating the air fluid pressure applied to the piston by means of an adjustable pressure-regulating reduction valve connected in the fluid conduit between a source of fluid pressure and the piston cylinder.

However, the present air pressure regulating valves will not provide a sufficiently large range of air pressures to produce the range of piston forces necessary for the proper operation of many piston operated devices. The present pressure regulating valves will operate to provide constant secondary pressures only as low as approximately 6 pounds per square inch and will provide a range of pressures of only 10 to 1 or a maximum pressure of 60 pounds per square inch. This necessarily limits the range of forces that can be provided by a piston whose operating air pressure is regulated by such a valve, since, if the piston is designed to produce its maximum desired force under 60 pounds per square inch air pressure, the minimum constant regulated force that the piston can produce will be limited to one tenth of that maximum force. Conversely, if the piston is designed to give the desired minimum piston force, the maximum piston force will be only ten times this minimum force.

In many devices operated by an air pressure actuated piston a much greater range of piston forces than 10 to 1 is required and it is, therefore, an object of my invention to provide a system for operating fluid pressure actuated pistons which shall function to extend the range of forces provided by such pistons.

Another object of my invention is to provide an operating system for a pressure fluid operated piston which shall function to greatly extend the range of forces produced by the piston by pre-loading the piston.

A further object of my invention is to provide an operating system for a pressure fluid operated piston which shall function to cause the force exerted by the piston to have a value as low as zero or even a negative value.

Another object of my invention is to provide a system for producing a wide range of tensions on a strip of material by means of a pressure roller actuated by an air-pressure-operated piston, which shall function to provide such a wide range of tensions by pre-loading the actuating piston.

These and other objects and advantages of my invention will be apparent from the following detailed description taken in connection with the accompanying drawings.

In practicing my invention, I provide an air pressure actuated piston for exerting an operating force, the force exerted being adjustable by adjusting the air pressure acting on the piston. In order to provide very low values of piston forces without having to regulate air pressures at very low values, a biasing force is applied to the piston so that the lowest air pressure that need be employed to produce very low, or zero, piston force is that pressure which will just balance the biasing force. Thus the air pressure supplied to the piston is controlled in a range in which it can be easily and accurately controlled while providing a range of piston forces which may vary from zero to any desired amount.

I have disclosed one practical embodiment of my invention, wherein the pre-loaded air pressure operated piston of my invention operates to actuate a pressure roll in a system for maintaining a predetermined adjustable tension on a strip of material, as shown in the accompanying drawings, in which:

Figure 1 is a diagrammatic view of a strip tension control system in which the preferred embodiment of my air pressure operated pre-loaded piston is employed to provide any desired pressure on the tensioning roll; and Figs. 2 and 3 are diagrammatic views of alternative embodiments of pre-loaded air pressure operated pistons which may be used in the system shown in Fig. 1.

Referring to Fig. 1 of the drawings, I have shown a strip 4 of material, such as steel, passing between adjacent reducing roll stands 6 and 8 in the direction shown by the arrow. The rolls of the roll stand 6 are driven by a motor 10 which is controlled by any suitable controller as shown. The rolls of the roll stand 8 are driven by the motor 12 through any suitable controller as shown.

Front tension on the strip at the roll stand 6 and back tension at the roll stand 8 is provided by a tensioning device 7 which comprises an idling roller 14 supported by an arm 16 which is pivoted on the support 18 and has a horizontally extending arm 20. A piston 22 operating in a cylinder 24 is disposed to exert a vertical pressure through a piston rod 26 upon the arm 20. It has been found that with the angle between the arm 16 and the horizontal line equal to approximately 51° a constant vertical pressure on the arm 20 will produce a substantially constant tension in the strip 4 within a limited range of deflection of the strip and the system herein provided has for its purpose to maintain a constant pressure upon the arm 20 through the medium of the piston 22, which pressure may be adjusted throughout a wide range to thus provide a wide range of adjustable constant tensions upon the strip 4.

The deflection of the strip 4 is maintained within the predetermined desired range by means of a regulator 11 which operates to govern the speed of the motor 12 to take up or let out slack in the strip 4 as such taking up or letting out of the slack in the strip is required. The regulator 11 comprises an arm 52 attached to and movable with the arm 16 and carrying contact elements 54 and 56. An arm 58 having a pivot 60 carries contact element 62 in such a relation to the contact elements 54 and 56 as to alternately engage the contact elements 54 and 56 when the arm 58 is oscillated about its pivot 60. A solenoid 64 is mechanically connected to the arm 58 to cause the arm 58 to oscillate as the solenoid 64 is intermittently energized and deenergized and the solenoid 64 is connected to any suitable source of current represented by the conductors X and Y through a circuit which comprises conductor X, conductor 66, the coil of solenoid 64, conductor 68, resistor 70 and conductor 72 to conductor Y. The resistor 70 is shunted by the contact element 74 of the relay 76 through a circuit which comprises conductor 78, contact element 74 and conductor 80. A circuit for the relay 76 is controlled by a contact element 82 operated by the solenoid 64 and extends from conductor X, through the coil of relay 76, conductor 84, contact element 82, conductor 86 and conductor 88 to conductor Y.

It will be seen that these circuits for solenoid 64 and relay 76 will cause intermittent actuation of the solenoid 64 and, therefore, the oscillation of the arm 58 to cause the contact elements 54 and 56 to be intermittently engaged by the contact element 62. The resistor 70 is of such value as to prevent sufficient current to flow through solenoid 64 to maintain its armature in the fully energized position but when contact element 74 is in closed circuit position, the resistance element 70 is shunted and allows sufficient current to flow in solenoid 64 to move its armature. When the full energization of solenoid 64 moves contact element 82 to closed circuit position, the circuit of relay 76 is energized causing the contact element 74 to move to open circuit position, thus removing the shunt from the resistor 70 and causing the armature of the solenoid 64 to drop. When the armature of the solenoid 64 drops, the contact element 82 moves to open circuit position deenergizing the relay 76 and permitting the contact element 74 to again close the shunting circuit for the resistor 70. This series of actions causes an oscillating motion of the arm 58.

The energizing circuit for the field winding 90 of the motor 12 extends from conductor Y, through conductor 88, conductor 92, resistors 94 and 96, conductor 98, rheostat 100, conductor 102, field winding 90 and conductor 104 to the conductor X. A shunting circuit is provided for the resistor 94 which extends from conductor 88, through conductor 106, normally closed contact element 108 of a relay 110, conductor 112 and conductor 114. A shunting circuit is provided for the resistor 96 which comprises conductor 114, conductor 112, a normally open contact element 116 of a relay 118, conductor 120 and conductor 98. An operating circuit is provided for the relay 110 which extends from conductor X, through conductor 66, conductor 122, contact element 62, contact element 56, conductor 124, relay 110 and conductors 86 and 88 to conductor Y. The operating circuit for relay 118 extends from conductor X, through conductors 66 and 122, contact element 62, contact element 54, conductor 126, the coil of relay 118 and conductors 86 and 88 to conductor Y. It will be seen that alternate energization of these circuits for the relays 110 and 118 causes these relays to alternately tend to increase and decrease the speed of the motor 12 by decreasing the flow of current in the field coil 90 of the motor 12 as a result of moving contact element 108 to open circuit position and increasing the flow of current in the field coil 90 of the motor 12 by the movement of the contact element 116 to closed circuit position. As the deflection of the strip 4 varies and, therefore, the position of arm 16 changes, the relative lengths of the periods of engagement of contact element 62 with the associated contact elements 54 and 56 will vary. This will cause variations in the speed increasing and speed decreasing effects upon the motor 12 to maintain the idler roll 14 and the strip 4 within a predetermined range of deflections.

The chamber of the cylinder 24 above the piston 22 is connected by means of a conducting pipe 28 to the low pressure chamber 30 of an adjustable pressure-regulating reducing-valve 32. The chamber of the cylinder 24 below the piston 22 is connected by a fluid conducting pipe 34 to the low pressure chamber 36 of an adjustable pressure-regulating reducing-valve 38. The high pressure chamber 40 of the regulating valve 32 is connected by a fluid conducting pipe 42 with any source of relatively high pressure fluid such as air shown as an air reservoir.

The regulating valve 32 comprises a high pressure chamber 40 and a low pressure chamber 30 with a valve 44 controlling the flow of air from the chamber 40 to the chamber 30. The chamber 30 has a flexible diaphragm 46 as one of its walls, the diaphragm 46 being so connected with the valve 44 as to tend to close the valve under the influence of the air pressure in the low pressure chamber 30 upon the diaphragm 46. Bearing upon the diaphragm in a position to exert a force on the diaphragm opposite in direction to the force exerted by the air pressure in the chamber 30 is a spring 48 supported on one end by an adjustable member 50 which is screw threaded in the body of the valve 32 to vary the force exerted by the spring 48 upon the diaphragm. It will be seen that with such a valve construction, when the force of the spring 48 upon the diaphragm 46 overcomes the force of the air pressure in the chamber 30 upon the diaphragm 46, the spring 48 will cause the valve 44 to open to thus permit fluid flow from the chamber 40 to the chamber 30 which, in turn, will increase the air pressure force upon the diaphragm 46 to cause the valve to close. In this manner the valve 32 will function to maintain a predetermined pressure in the low pressure chamber 30, pipe 28 and the chamber above the piston 22 in the cylinder 24, which may be adjusted by means of the adjusting member 50. The valve 38 has the same construction as the valve 32 and serves to maintain a predetermined pressure in the chamber below the piston 22 in the cylinder 24.

It will be seen that the resultant air pressure on the piston 22 and, therefore, the resultant force exerted by the piston rod 26 upon the arm 20 will be a function of the difference between the pressures in the upper and lower chambers of the cylinder 24. In order to provide a wide range of forces on the arm 20 and, therefore, a wide range of strip tensions, the regulating valve 38 is so adjusted as to provide approximately the least pressure in the lower chamber of the cylinder 24 that the valve 38 is capable of satisfactorily regulating and maintaining. If then the valve 32 is so adjusted as to provide an equal pressure in the chamber of the cylinder 24 above the piston 22, it will be seen that the resultant force exerted by the piston 22 on the arm 20 will be zero, since the resultant force on the piston is zero. If now it is desired to provide a predetermined tension on the strip 4 and to maintain this tension, it is only necessary to adjust the valve 32 so as to provide a pressure in the chamber of the cylinder 24 above the piston 22 which will be sufficiently above the pressure in the lower cylinder chamber to provide the desired resultant force on the arm 20.

Thus the range of effective pressures is from zero pressure to a pressure equal to the difference between the highest pressure that the valve 32 can provide and the lowest pressure that the valve 38 can properly and efficiently regulate. If a higher value of pressure provided by the regulating valve 38 is chosen as the biasing or preloading pressure, the effective pressure may be varied through a range from a value below zero an amount which is the difference between the biasing pressure provided by the valve 38 and substantially the lowest pressure which the valve 32 can properly regulate, which is in reality a negative pressure providing a lifting force on the arm 20 which will lower the idling roller 14. The effective pressure may be varied through zero pressure when the regulated pressure provided by the valve 32 is caused to equal the biasing pressure provided by the valve 38, and up to a positive effective pressure equal to the difference between the highest regulated pressure that can be provided by the valve 32 and the biasing pressure provided by the valve 38. It is understood that in such systems the piston 22 is so dimensioned with respect to the cylinder 24 as to permit leakage past the piston and the piston rod 26 is so dimensioned with respect to the opening in the wall of the cylinder 24 as to permit leakage past the piston rod so that there is a continuous flow of air from the cylinder to provide the necessary decrease in pressure in the cylinder when decrease in the force on the arm 20 is required.

In Fig. 2 of the drawings there is shown a modification of the device of Fig. 1 which varies from the embodiment of Fig. 1 only in the form of the fluid pressure operating device which provides the actuating force for the arm 20. It is to be understood that the elements of structure in Fig. 2 and Fig. 3 may be substituted for the corresponding elements of structure in the complete system shown in Fig. 1 and the corresponding elements of structure in the three figures have the same reference characters. Referring to Fig. 2, the adjustable pressure regulating reducing valves 32 and 38 provide operating and biasing forces on the piston rod 26 by providing regulatable constant pressures on the pistons 128 and 130 in cylinders 132 and 134, respectively. It will be seen that when substantially the lowest pressure which can be properly regulated by the valve 38 is supplied to the cylinder 134 through the air conductor 34, a biasing force will be provided which is equal to this pressure multiplied by the area of the piston 130. Acting against this biasing or preloading force is the force resulting from the pressure in the cylinder 132 on the piston 128 provided by the regulating valve 32 through the air conductor 36. The effective pressure obtained with this construction will be zero when the product of the pressure provided by the valve 38 and the area of the piston 130 is equal to the pressure provided by the valve 32 multiplied by the area of the piston 128. By selectively varying the pressure provided by the valve 32, the effective force on the arm 20 may be increased to a maximum of the difference between the maximum pressure which can be provided by the valve 32 multiplied by the area of the piston 128, and the product of the pressure provided by the valve 38 and the area of the piston 130. Thus the range of tensions on the strip 4 has been greatly extended by providing much lower tensions than it has hereto been possible to produce.

In Fig. 3 another means for providing a preloading or biasing force to the arm 20 is shown. In this embodiment a single adjustable pressure regulating reducing valve 32 is provided for supplying, through an air conductor 28, a selectable variable pressure on the piston 136 in the cylinder 138. This means comprises a weight 140 acting through a flexible cord 142 over the rollers as shown to provide an upward vertical biasing force on the piston rod 144 which is attached to the arm 20. In this modification the biasing or preloading force is equal to the weight 140 and zero force on the arm 20 may be provided by so adjusting the air pressure supplied by the valve 32 to the cylinder 138 to make the product of the pressure times the area of the piston 136 equal to the weight 140.

It is to be understood that the principles of the invention disclosed herein may be extended to other fluid pressure operated apparatus where a wide range of effective pressures or resultant forces is desired and that the invention is not limited to the specific application of the principles of my invention to the strip tension regulating system disclosed herein. It is also to be understood that the preloading or biasing forces discussed in the description of my invention need not be limited to biasing weights or biasing forces provided by fluid pressure operated pistons but may be provided by such force producing devices as springs, solenoids, torque motors or equivalent devices.

In compliance with the requirements of the patent statutes I have shown and described herein the preferred embodiments of my invention. It is to be understood, however, that the invention is not limited to the precise constructions herein described but is capable of modification by one skilled in the art, the embodiments herein shown being merely illustrative of the principles of my invention.

I claim as my invention:

1. In a device for producing tension in a strip of material as it passes between adjacent work devices, roller means disposed to engage the strip to produce lateral displacement of the strip and subject it to a tension, and means for pressing said roller means against the strip comprising a pressure fluid operated device, a source of fluid under pressure, pressure regulating means between said pressure fluid operated device and said source of fluid pressure, and means biasing said pressure fluid operated device for movement in a direction opposite to the direction of movement of the device by the regulated pressure, the force of said biasing means being at least equal to the force exerted upon said pressure fluid operated device when the fluid pressure on said pressure fluid operated device is the minimum that can be properly regulated by said pressure regulating means.

2. In a tandem strip rolling mill, an idling roller mounted for movement with respect to the normal pass line of the strip to produce lateral displacement of the strip and subject it to a tension and means for producing said lateral movement comprising a pressure fluid actuated piston, a pressure regulating reducing valve for regulating the fluid pressure applied to said piston, and means biasing said piston for movement in a direction opposite to the direction of movement of the piston by the regulated pressure fluid, the force of said biasing means being at least equal to the force exerted upon said piston when the fluid pressure on said piston is the minimum that can be properly regulated by said regulating valve.

3. In a tandem strip rolling mill, an idling roller mounted for movement with respect to the normal pass line of the strip to produce lateral displacement of the strip and subject it to a tension and means for producing said lateral movement comprising a pressure fluid actuated piston, a pressure regulating reducing valve for regulating the fluid pressure applied to said piston, and means biasing said piston for movement in a direction opposite to the direction of movement of the piston by the regulated pressure fluid, the force of said biasing means being at least equal to the force exerted upon said piston when the fluid pressure on said piston is the minimum that can be properly regulated by said regulating valve, said biasing means comprising pressure fluid actuated means acting upon said piston.

4. In a strip rolling mill, an idling roller mounted for movement with respect to the normal pass line of the strip to produce tension in the strip by lateral displacement of the strip from its normal pass line, a double acting pressure fluid operated piston and cylinder device connected to produce said lateral movement of said idling roller, means providing a substantially constant fluid pressure on one side of said piston to bias said piston to move said roller in a direction opposite to the strip displacing direction of movement, and means providing a fluid pressure on the other side of said piston to move said piston against said bias in the strip displacing direction.

5. In a strip rolling mill, an idling roller mounted for movement with respect to the normal pass line of the strip to produce tension in the strip by lateral displacement of the strip from its normal pass line, a double acting pressure fluid operated piston and cylinder device connected to produce said lateral movement of the idling roller, means providing a substantially constant fluid pressure on one side of the piston to bias said piston to move the roller in a direction opposite to the strip displacing direction of movement, and means providing a fluid pressure on the other side of the piston to move said piston against the bias in the strip displacing direction, said means providing a fluid pressure on the other side of the piston comprising a pressure regulating reducing valve, and the biasing pressure on the one side of the piston being at least as great as the lowest pressure which the regulating valve is capable of properly regulating.

6. In a strip rolling mill, an idling roller mounted for movement with respect to the normal pass line of the strip to produce tension in the strip by lateral displacement of the strip from its normal pass line, a first pressure fluid operated piston for producing a force in the direction of said lateral displacement of said idling roller, and a second pressure fluid operated piston for producing a substantially constant biasing force opposite to the force produced by said first piston.

7. In a strip rolling mill, an idling roller mounted for movement with respect to the normal pass line of the strip to produce tension in the strip by lateral displacement of the strip from its normal pass line, a first pressure fluid operated piston for producing a force in the direction of said lateral displacement of said idling roller, a second pressure fluid operated piston for producing a biasing force opposite to the force produced by said first piston, a pressure regulating reducing valve for regulating the fluid pressure on said first piston, and means providing a substantially constant fluid pressure on the second piston of such a value as to effect a biasing force at least equal to the force exerted by the first piston when acted upon by the smallest pressure which said regulating valve can properly regulate.

8. In a strip rolling mill, an idling roller mounted for movement relative to the normal pass line of the strip to thus bear against and tension the strip, a pressure fluid operated piston for pressing said roller against the strip, a fluid pressure regulating reducing valve for regulating the fluid pressure on said piston, and a weight operating to bias said piston in a direction opposite to the direction of movement of said piston under the influence of said fluid pressure, said weight operating to provide a biasing force at least equal to the force exerted on the piston by the fluid pressure when the value of said fluid pressure is the least that the regulating valve can properly regulate.

9. In a control system for a pressure fluid operated device, a pressure fluid operated piston, means for regulating the fluid pressure acting on one side of said piston, said regulating means comprising an adjustable pressure-regulating reduction valve, and means for maintaining a continuous substantially constant biasing fluid pressure on the other side of said piston, said biasing pressure being at least equal to the lowest fluid pressure that the reducing valve is capable of properly regulating.

10. In a control system for a pressure fluid operated device, a pressure fluid operated piston, means for regulating the fluid pressure acting on said piston comprising an adjustable pressure-regulating reduction valve, and means applying a continuous substantially constant biasing force to the piston, said biasing force acting in the opposite direction to the fluid pressure and being at least as large as the force exerted on the piston by said pressure fluid when the fluid pressure is the smallest that the reducing valve can properly regulate.

11. In a strip rolling mill, an idling roller mounted for movement relative to the normal pass line of the strip and means for providing said movement of said roller comprising means biasing said roller for movement away from the strip, a pressure fluid operated piston for moving said roller against the strip to displace the strip from its normal pass line and thus tension the strip, means for adjusting the fluid pressure acting on said piston, the range of fluid pressure adjustment being from a value such that the fluid pressure force on the piston is less than the said biasing force to such a value as will provide any desired strip tension, so that said roller may be moved away from the strip and against the strip with any desired force by properly adjusting the fluid pressure acting on the piston.

WILLARD G. COOK.